(12) United States Patent
Wiegert

(10) Patent No.: US 6,841,994 B1
(45) Date of Patent: Jan. 11, 2005

(54) MAGNETIC ANOMALY SENSING SYSTEM FOR DETECTION, LOCALIZATION AND CLASSIFICATION OF MAGNETIC OBJECTS

(75) Inventor: Roy F. Wiegert, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/789,481

(22) Filed: Mar. 1, 2004

(51) Int. Cl.$^7$ .............................................. G01R 33/02
(52) U.S. Cl. ...................... 324/244; 324/260
(58) Field of Search ........................ 324/244, 246–247, 324/260, 210–213, 326, 345

(56) References Cited

U.S. PATENT DOCUMENTS 5,777,477 A * 7/1998 Wynn .......................... 324/345

6,476,610 B1 * 11/2002 Wiegert et al. ............. 324/345

\* cited by examiner

*Primary Examiner*—Bot LeDynh
(74) *Attorney, Agent, or Firm*—Donald G. Peck; James T. Shepherd

(57) ABSTRACT

A magnetic anomaly sensing system uses triaxial magnetometer (TM) sensors arranged in a three-dimensional array. A processor coupled to the TM sensors generates partial gradient contraction data, and complete gradient tensor data and corresponding complete gradient contraction data. The generated data can be used to align the three-dimensional array with a magnetic target. Once the three-dimensional array is aligned with the magnetic target, the generated data can be used to uniquely determine (i) distance to the magnetic target, (ii) position of the magnetic target relative to the three-dimensional array, and (iii) the magnetic dipole moment of the magnetic target.

22 Claims, 7 Drawing Sheets

MAGNETIC ANOMALY SENSING SYSTEM FOR DETECTION, LOCALIZATION AND CLASSIFICATION OF MAGNETIC OBJECTS

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to magnetic sensing systems, and more particularly to a magnetic anomaly sensing system that can be used to detect a magnetic object, unambiguously localize the magnetic object, and classify the magnetic object through the unambiguous measurement of the object's magnetic moment.

BACKGROUND OF THE INVENTION

In principle, magnetic sensing technologies can be used by divers or autonomous underwater sensing platforms (e.g., Autonomous Unmanned Vehicles (AUVs)) for detection, localization and classification (DLC) of magnetic objects. For example, underwater mines in littoral "very shallow water/surf zone" (VSW/SZ) environments constitute magnetic objects that may be located in the sea bottom, tethered at mid depth or floating at the surface. Therefore, fully autonomous magnetic DLC of all underwater mines requires magnetic sensing systems that will function effectively onboard highly-mobile sensing platforms such as free-swimming divers or small robotic submarines that are capable of unconstrained three-dimensional motion. Accurate identification of mine-like objects often requires the sensing platform to approach very close to the object. Therefore, it is desirable that magnetic sensing system be able to guide the sensing platform toward the object, i.e., "to home in on" the object. Other potential applications for magnetic sensing systems that involve similar unconstrained three-dimensional sensing platform motion include small robotic flying craft using magnetic sensors to remotely detect, localize and home in on magnetic objects such as land-based mines, camouflaged enemy tanks or even hidden nuclear facilities. In practice, however, the mobile magnetic sensing art has been limited by the fact that the very small magnetic signals of magnetic objects are convolved within the much larger background magnetic field of the Earth.

Magnetically polarized objects or targets such as underwater mines create characteristic dc magnetic field anomalies within the relatively constant background magnetic field of Earth. Magnetic sensing systems can detect the magnetic anomalies or target "signatures" and use the magnetic signature data to detect, localize and classify the mines. It is well-known that at distances greater than two or three times an object's linear dimensions, its magnetic signature (measured in "Tesla") approximates that of a dipole with well-defined mathematical characteristics. However, magnetic dipole field magnitudes decrease with the inverse cube of distance. Thus, at object-to-sensor distances of a few meters, a mine-like object's magnetic signature strength rapidly becomes very small (i.e., on the order of nano-Tesla or $10^{-9}$ T, or even pico-Tesla or $10^{-12}$ T) in comparison to the Earth's 50 micro-Tesla (or $10^{-6}$ T) background field. As a result, a basic challenge for mobile magnetic sensors is the need to discriminate the very small dc target signature components that are convolved with the relatively very large field of Earth. Sensor motion in the very large Earth field can cause relatively huge, orientation-dependent changes in measured vector field components. The large, non-target-related changes in measured field components can overwhelm the relatively small target signatures and thereby reduce the sensor's effective DLC range.

For small autonomous sensing platforms, additional challenges to effective use of magnetic sensors (for DLC of magnetic objects/targets) derive from the platforms' small size, power and computational budgets. The platform constraints require that the magnetic sensors be small and operate well with small power and computational budgets. Further, in littoral VSW/SZ environments, target localization range can be reduced as the of ten turbulent, three-dimensional nature of these environments typically will cause large changes in sensor system orientation that will exceed the motion tolerance capability of conventional magnetic sensor approaches. Still further, the operational constraints that are imposed by the naval diving environment largely preclude the practical use of conventional prior art magnetic sensor system designs and methods based on magnetic scalar total field or magnetic vector/gradient tensor technologies.

In order to meet the challenges of providing practical and effective magnetic target DLC capabilities for small, highly-mobile maneuverable sensing platforms, U.S. Pat. No. 6,476,610, (i.e., "the '610 patent" as it will be referred to hereinafter) teaches a novel magnetic anomaly gradient sensing system and signal processing concept. The disclosed approach is based on the use of vector triaxial magnetometers (TM) for magnetic field sensing, and the use of triaxial accelerometers for measurement of sensing platform motion and orientation.

Briefly, the '610 patent discloses a target localization approach denoted as Scalar Triangulation and Ranging (STAR). The STAR method uses simplified scalar "contractions" of magnetic gradient tensor components to determine relative distances to an object, i.e., "triangulate" the object's location. The symmetry properties of the gradient contraction, combined with the '610 patent's sensor array geometries, help to mitigate the adverse effects of large changes in sensor platform orientation. Also, the mathematical simplicity of the STAR approach requires relatively little computer processing power and is, therefore, relatively easy to implement onboard small autonomous highly maneuverable sensing platforms. Furthermore, as disclosed in a subsequent related U.S. patent application Ser. No. 10/373,493, filed Feb. 19, 2003, (i.e., "the '493 application" as it will be referred to hereinafter), the symmetry properties of the gradient contraction scalars measured by each single "axis" (i.e., each set of two TMs) can be exploited to provide robotic Underwater Bottom Vehicles (UBVs) with robust two-dimensional magnetic anomaly guidance for homing in on magnetic targets.

While gradient contraction-based DLC of magnetic targets is a promising approach for highly-mobile sensing platforms, the approaches of the '610 patent and the '493 application have the following shortcomings with regard to efficient DLC of magnetic targets:

(1) The '610 patent does not provide robust target localization information for all three dimensional sensor-target orientations. That is, for certain orientations of the sensor embodiments of the '610 patent with respect to the target, the sensor-target distance (i.e., range) may be ambiguous or indeterminate.

(2) The particular implementations of the '610 patent's and the '493 application's STAR method are based on comparisons of partial gradient contractions of single-axis array elements that do not provide an accurate measurement of the target's vector dipole moment strength, M. However, the true magnitude and direction of M constitute the basis of a target's magnetic signature thereby providing an important basis for target classification. Accurate measurements of M are required to distinguish between real mines and underwater magnetic debris such as, for example, "tin cans." Thus, the lack of robust dipole moment classification can lead to frequent "false alarms" with regard to the detection of non-mine-like targets and consequently require inefficient use of maneuverable platform resources if they are used to home in on undesired targets. Note that inaccurate measurements of M can also result in inaccuracies in target localization.

(3) The sensor system embodiments and methods disclosed in the '493 application are essentially limited to two dimensional magnetic guidance (where the sensing platform and target are nearly in the same plane) and do not provide explicit target location and classification information. On the other hand, while the '610 patent is not limited to two dimensional platform motion, it does not develop magnetic guidance signals that are easily used by a vehicle operator or controller for homing in on magnetic targets.

(4) The '610 patent and the '493 application are not capable of detecting or discriminating whether the sensor is in the far field zone or the near field zone of a magnetic target. However, validity of DLC calculations depends on which target zone the sensor is located. Therefore, the far-field/near-field information is important for a sensor system that can be used to home in on a magnetic target.

SUMMARY OF THE INVENTION

Accordingly, it is an object of the present invention to provide a magnetic anomaly sensing system.

Another object of the present invention is to provide a magnetic anomaly sensing system that can be used to detect a magnetic object, unambiguously localize the magnetic object, and classify the magnetic object through the unambiguous measurement of the object's magnetic moment.

Other objects and advantages of the present invention will become more obvious hereinafter in the specification and drawings.

In accordance with the present invention, a magnetic anomaly sensing system uses a plurality of triaxial magnetometer (TM) sensors with each of the TM sensors having X,Y,Z magnetic sensing axes. The TM sensors are arranged in a three-dimensional array with respective ones of the X,Y,Z magnetic sensing axes being mutually parallel to one another in the three-dimensional array. The three-dimensional array defines a geometry that (i) collinearly aligns at least three of the TM sensors in a spaced-apart fashion along an axis to form a plurality of single-axis gradiometers along one of the X,Y,Z magnetic sensing axes, and (ii) positions at least four of the TM sensors in a spaced-apart fashion in a planar array that is perpendicular to the axis. A processor coupled to the TM sensors generates (i) partial gradient contractions for each of the single-axis gradiometers, and (ii) partial gradient contractions, and complete gradient tensors and corresponding complete gradient contractions for gradiometers formed by the planar array. The generated data can be used to (a) align the axis of the three-dimensional array with a magnetic target, and (b) once the axis is aligned with the magnetic target, uniquely determine (i) distance to the magnetic target, (ii) position of the magnetic target relative to the three-dimensional array, and (iii) the magnetic dipole moment of the magnetic target.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
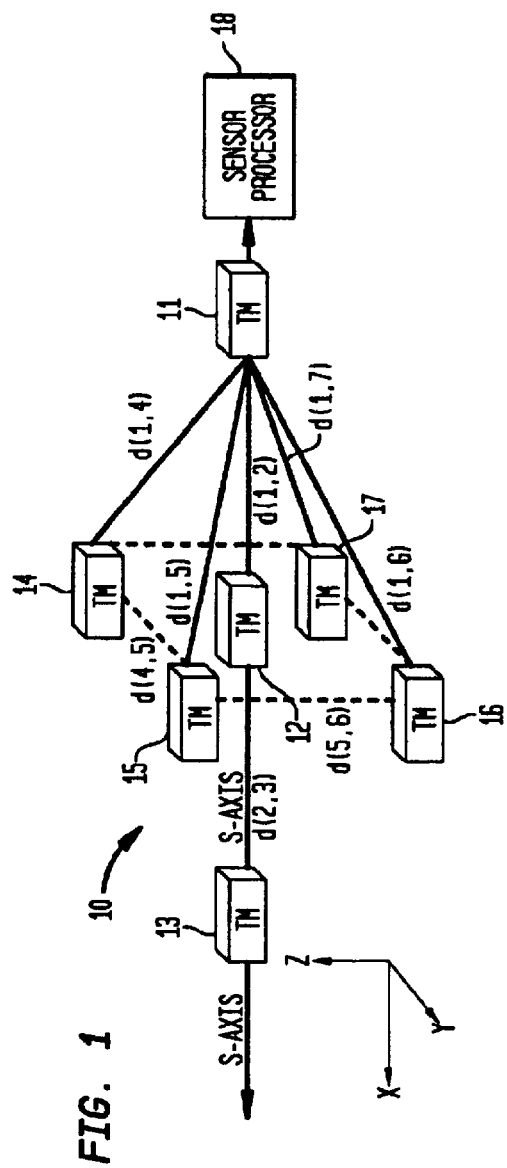
FIG. 1 is a schematic view of a multi-axis magnetic sensor array in accordance with the present invention.

Prior to describing the present invention, a review of magnetic phenomena relevant to the design of magnetic sensor systems will be provided. Throughout this disclosure, vector quantities are denoted by boldface type and scalar quantities by normal type. In general, the design and operation of apparatuses and methods used for detection, localization and classification (DLC) of magnetically polarized objects depend on the following:

(1) The existence of vector magnetic fields BA that emanate from the objects' net magnetization M. The $B_A$ fields constitute relative small, short range "magnetic anomalies" within the Earth's background field.

(2) The relatively large and locally nearly constant magnetic induction field of Earth (designated as $B_E$) that permeates all space around the planetary surface. The $B_E$ field may induce much of an object's magnetic anomaly field. However, since the relatively small target anomaly field is convolved with $B_E$, the Earth's field also complicates the process of DLC of magnetic objects using mobile sensing platforms.

The vector magnetic induction field $B_A$ of a magnetically polarized object at distances r greater than about three times the object's longest dimension is given by the well known "dipole approximation", namely, $$B_A(r)=(\mu/4\pi)[3(Mer)r/r^5-M/r^3] \quad (1)$$

where $B_A(r)$ is the vector magnetic induction (in units of Tesla or "T") at a point defined by a position vector r (in units of meters or "m") relative to a vector magnetic dipole source M (in units of Amperes×meter squared or "$Am^2$"). The parameter $\mu$ is the magnetic permeability (in units of Tm/A) which is approximately equal to $4\pi\times10^{-7}$ Tm/A for non-magnetic media.

In a Cartesian coordinate system with unit vectors i, j and k along the XYZ directions, the vectors $B_A$, r and M can be written in terms of their components or $B_A=r=iB_{AX}+jB_{AY}+kB_{AZ}$ and $M=iM_X+jM_Y+kM_Z$. The scalar magnitudes r and M, and the product Mer, respectively, can be written as $r=(X^2+Y^2+Z^2)^{0.5}$ and $M=(M_X^2+M_Y^2+M_Z^2)^{0.5}$, and or $M_XX+M_YY+M_ZZ$. Using these relationships, equation (1) can be written to explicitly represent the components of $B_A$ in terms of six independent scalar components (X,Y,Z and $M_X,M_Y,M_Z$) as:

$$B_{AX}=[(3X^2-r^2)M_X+3XYM_Y+3XZM_Z]r^{-5} \quad (2A)$$

$$B_{AY}=[3XYM_X+(3Y^2-r^2)M_Y+3YZM_Z]r^{-5} \quad (2B)$$

$$B_{AZ}=[3XZM_X+3YZM_Y+(3Z^2-r^2)M_Z]r^{-5} \quad (2C)$$

For notational convenience, the constant $(\mu/4\pi)$ has been absorbed into the dipole term M. The scalar magnitude $B_A$ is given by the square root of the sum of squares of the individual XYZ components of $B_A$ vector so that $$B_A=[(B_{AX})^2+(B_{AY})^2+(B_{AZ})^2]^{0.5} \quad (3)$$

Accurate DLC of magnetic objects requires the use of apparatus and methods that can measure and process $B_A$ field components at different points in order to determine both the XYZ coordinates of a target's position and the $M_X,M_Y,M_Z$, components of the target's dipole moment. However, direct measurements of $B_A$ are complicated by the relatively very large Earth field $B_E$ which has a nearly constant magnitude $B^E$ of about 50,000 nanoTesla (nT) at the Earth's surface. Equation (1) indicates that the anomaly fields that are associated with magnetic objects decrease with the inverse cube of distance to the objects, i.e., $B_A \propto r^{-3}$. Therefore, $B_E$ is generally much larger than $B_A$ except for field points that are measured very close to the target.

The Earth's field and anomaly field vectors sum to create a total field $B_T$. Therefore, direct measurements of magnetic field actually involve measurement of a total field $B_T$ that is given by $$B_T = B_E + B_A = (B_{EX} + B_{AX})i + (B_{EY} + B_{AY})j + (B_{EZ} + B_{AZ})k \quad (4)$$

$$= B_{TX}i + B_{TY}j + B_{TZ}k$$

The magnitude of $B_T$ or $B_T$ can be written as $$B_T=(B_{TX}^2+B_{TY}^2+B_{TZ}^2)^{0.5} \quad (5)$$

The quantity $B_T$ is a rotationally invariant scalar. Unfortunately, $B_T$ is not a robust quantity. That is, $B_T$ does not always increase as the sensor-target distance, r decreases. Consequently, $B_T$ does not provide a good basis for target localization. Unlike the quantity $B_A$, $B_T$ isn't robust because, at a given sensor-target distance in some regions in target space, the $B_E$ and $B_A$ fields point in the same direction and thereby increase the magnitude of $B_T$. However, in other regions, the $B_E$ and $B_A$ fields point in opposite directions thereby decreasing the magnitude of $B_T$.

To use $B_A$ to detect and "home in on" or localize magnetic objects from high-mobility sensing platforms, apparatus and methods are required that can detect and discriminate relatively small target signatures $B_A$ that are convolved with the Earth's field $B_E$ and efficiently extract the target position and dipole moment information from the $B_A$ signature measurements. The detection/discrimination of $B_A$ usually requires sensor systems that can measure the spatial rate of change or gradient of $B_T$.

In the absence of field anomalies caused by magnetic objects, $B_E$ constitutes a fairly uniform background field. Typically, the variation of $B_E$ with distance, i.e., the gradient of $B_E$ or $\nabla B_E$ is approximately 0.02 nT/meter. (The gradient operator is defined by $\nabla \equiv i\partial/\partial x+j\partial/\partial y+k\partial/\partial z$.) Therefore, the effects of $B_E$ can be much reduced by developing sensors that measure the gradient of $B_T$. Mathematically, $\nabla B_T=\nabla(B_E+B_A)=\nabla B_E+\nabla B_A \approx 0.02$ nT/m$+\nabla B_A \approx \nabla B_A$ so measurement of the gradient of $B_T$ essentially yields the gradient of $B_A$.

The first order gradient $\nabla B_A$ (where $|B_A(r)| \propto r^{-4}$) of the vector field of equation (1) is a second rank tensor having matrix elements given by the following expression $$(\nabla B)_{ij} \equiv G_{ij} \equiv \partial B_i/\partial r_j \quad (6)$$

$$= -3[Mor(5r_ir_j - r^2\delta_{ij}) - r^2(r_iM_j + r_jM_i)]r^{-7}$$

$$= -3[(M_XX + M_YY + M_ZZ)(5r_ir_j - r^2\delta_{ij}) - r^2(r_iM_j + r_jM_i)]r^{-7}$$

Note that in equation (6) and in the remainder of the description, the quantity/vector B/B will appear without the use of the subscript "A" (for an anomaly field) in order to simplify recitation of the equations. Thus, it is to be understood that a recitation of B or B represents a general magnetic induction field that may include a magnetic anomaly. The $r_i$ terms refer to the X,Y,Z Cartesian coordinates at the measuring point ($r_1 \equiv X$, $r_2 \equiv Y$, $r_3 \equiv Z$). The $\delta_{ij}$ factor is 1 if i equals j, and the $\delta_{ij}$ factor is 0 if i does not equal j. Writing the equation for $G_{ij}$ in matrix form yields $$\begin{matrix} & & & (X) & (Y) & (Z) \\ G_{xx} & G_{xy} & G_{xz} & \partial B_x/\partial x & \partial B_x/\partial y & \partial B_x/\partial z \\ G_{yx} & G_{yy} & G_{yz} & = \partial B_y/\partial x & \partial B_y/\partial y & \partial B_y/\partial z \\ G_{zx} & G_{zy} & G_{zz} & \partial B_z/\partial x & \partial B_z/\partial y & \partial B_z/\partial z \end{matrix}$$

-continued $$\approx \begin{matrix} (X) & (Y) & (Z) \\ \Delta B_x/\Delta x & \Delta B_x/\Delta y & \Delta B_x/\Delta z \\ \Delta B_y/\Delta x & \Delta B_y/\Delta y & \Delta B_y/\Delta z \\ \Delta B_z/\Delta x & \Delta B_z/\Delta y & \Delta B_z/\Delta z \end{matrix}$$

Each (X), (Y) and (Z) column of the matrix represents the rate of change of the components of B along a particular X, Y or Z direction (or "axis") in space.

Some simplification of the magnetic gradient tensor occurs as a result of Maxwell's Equations for the divergence and curl of B, namely, $\nabla \cdot B=0$ and $\nabla \times B=0$.
Consequently, the gradient tensor matrix is both "traceless" and "symmetric." Here, "traceless" means that the sum of matrix elements on the principal diagonal of the matrix is zero, while "symmetric" means that matrix elements across the diagonal are equal. Note that because of the traceless and symmetric features of the gradient tensor matrix, measurement of five independent tensor components can be used to completely determine the full, nine component gradient tensor. This invention uses these symmetry features of the magnetic gradient to determine a plurality of full gradients and their "contractions."

With regard to the actual measurement process, the finite difference elements, $\Delta B_x/\Delta x$, $\Delta B_x/\Delta y$, $\Delta B_x/\Delta z$, etc., approximate the mathematical gradient components $\partial B_x/\partial x$, $\partial B_x/\partial y$, $\partial B_x/\partial z$, etc., as vector field components are (i) measured at spatially separated points along the XYZ axes, (ii) the field values at one point are subtracted from the values at another, and (iii) the resultant differential field values are divided by the directed distances $\Delta X$, $\Delta Y$ and $\Delta Z$ between the points. The resulting quantity represents the average gradient at the midpoint of the respective distance $\Delta X$, $\Delta Y$ or $\Delta Z$.

Explicitly expanding equation (6) in terms of its X, Y, Z, $M_X$, $M_Y$ and $M_Z$ components (or simply applying the gradient operator $\nabla = i\partial/\partial x + a\partial/\partial y + k\partial/\partial z$ to equation (2)) results in the following set of equations. This set of equations, referred to herein simply as "equation (8)", relates the five independent gradient components and the six unknown quantities x, y, z, $M_x$, $M_y$ and $M_z$.

$$\partial B_x/\partial x = -(\partial B_y/\partial y + \partial B_z/\partial z) \quad (8)$$
$$= [3x(3r^2 - 5x^2)M_x + 3y(r^2 - 5x^2)M_y + 3z(r^2 - 5x^2)M_z]r^{-7}$$

$$\partial B_y/\partial y = -(\partial B_x/\partial x + \partial B_z/\partial z)$$
$$= [3x(r^2 - 5y^2)M_x + 3y(3r^2 - 5y^2)M_y + 3z(r^2 - 5y^2)M_z]r^{-7}$$

$$\partial B_z/\partial z = -(\partial B_x/\partial x + \partial B_y/\partial y)$$
$$= [3x(r^2 - 5z^2)M_x + 3y(r^2 - 5z^2)M_y + 3z(r^2 - 5z^2)M_z]r^{-7}$$

$$\partial B_x/\partial y = \partial B_y/\partial x = [3y(r^2-5x^2)M_x + 3x(r^2-5y^2)M_y - 15xyzM_z]r^{-7}$$

$$\partial B_x/\partial z = \partial B_z/\partial x = [3z(r^2-5x^2)M_x - 15xyzM_y + 3x(r^2-5z^2)M_z]r^{-7}$$

$$\partial B_y/\partial z = \partial B_z/\partial y = [-15xyzM_x + 3z(r^2-5y^2)M_y + 3y(r^2-5z^2)M_z]r^{-7}$$

From the general theory of equations, it is known that in order to solve for a given number of unknown quantities a number of independent equations that is equal to the number of unknowns is required. Consequently, by itself, the five-independent-equation set forth in equation (8) does not contain sufficient information to unambiguously determine the six unknown quantities x, y, z, $M_x$, $M_y$ and $M_z$ that are needed for effective DLC of mines from maneuverable sensing platforms.

Just as the magnitude of a vector is given by the square root of the sum of the "contracted" (i.e., squared) vector components, the magnitude of a gradient tensor is given by the square root of the sum of contracted tensor components. In Cartesian (XYZ) coordinates, the total gradient contraction CT of the magnetic gradient tensor G can be represented by the following expression.

$$C_T^2 = \sum (G_{ij})^2 = G_{xx}^2 + G_{xy}^2 + \ldots \quad (9)$$
$$= (\partial B_x/\partial x)^2 + (\partial B_x/\partial y)^2 + (\partial B_x/\partial z)^2 + (\partial B_y/\partial x)^2 +$$
$$(\partial B_y/\partial y)^2 + (\partial B_y/\partial z)^2 + (\partial B_z/\partial x)^2 + (\partial B_z/\partial y)^2 +$$
$$(\partial B_z/\partial z)^2$$
$$\approx (\Delta B_x/\Delta x)^2 + (\Delta B_x/\Delta y)^2 + (\Delta B_x/\Delta z)^2 + (\Delta B_y/\Delta x)^2 +$$
$$(\Delta B_y/\Delta y)^2 + (\Delta B_y/\Delta z)^2 + (\Delta B_z/\Delta x)^2 + (\Delta B_z/\Delta y)^2 +$$
$$(\Delta B_z/\Delta z)^2$$

The gradient contraction $C_T^2$ of the full, nine component magnetic gradient tensor is a rotationally invariant and robust scalar that does not change with changes in sensing platform orientation. In order to obtain all nine components of the gradient tensor, at least five independent tensor components must be measured. For the present invention, this is done using two non-collinear axes of three-sensor arrays.

Each of the sensing elements used in the present invention is a triaxial magnetometer (TM) sensor. As is known in the art, a TM sensor has three mutually orthogonal magnetic field sensing axes for sensing magnetic field (i.e., B-field) components ($B_x$, $B_y$, $B_z$). The sense axis directions define a convenient and computationally efficient choice for a local (X,Y,Z) coordinate system.

The design and construction requirements that the B-field component sensing axes of the TM sensors used in the present invention are as follows:

Provide a signal output that responds to the vector component of magnetic field along a single direction in space (i.e., the sensitive axis) and not respond to field components that are orthogonal to the sensitive axis.

Have a frequency response from DC to frequencies high enough to include the entire sensor-motion-induced frequency spectrum contained in a target's induction field.

Have sufficient sensitivity and dynamic range to effectively detect and discriminate small anomaly fields in the large background field of the earth.

Be of small physical size to allow a triad of sensors to be mutually configured in very close proximity as a triaxial array with orthogonal sense axes.

Be easily and accurately compensated for the individual differences between the sensor channels' gain and alignment in the sensor system reference frame.

Present day vector magnetometer technology and recent advances in micro-electromechanical systems (MEMS) technology allows these criteria to be fulfilled by a variety of sense elements such as triaxial fluxgate magnetometers, giant magnetoresistive devices, giant magnetoimpedance devices, superconducting quantum interference (SQUID) devices and enhanced sensitivity Hall effect devices. Although not required by the present invention, efficient DLC of mines may require that some form of navigational, positional information be available to be correlated with the target position and magnetic moment data that the invention provides. Accordingly, each TM sensor could incorporate a triaxial accelerometer as described in the previously-discussed '610 patent, the contents of which are hereby incorporated by reference.

FIG. 1 is an embodiment of a multi-axis magnetic sensor array 10 that contains the principal geometrical features that allow development of this invention's improved gradient contraction-based STAR approach for complete 3-dimensional DLC of magnetic targets and guidance to the magnetic targets. This particular embodiment consists of seven TM sensors 11–17 that are mounted in fixed positions on a rigid, non-magnetic support structure (not shown) with their respective XYZ axes parallel to each other. The non-magnetic support structure for TM sensors 11–17 is omitted from the drawings for clarity of illustration. The particular construction of such a support structure is well within the expertise of one of ordinary skill in the art and is, therefore, not a limitation of the present invention.

Two or more TM sensors that are located on a line constitute an "axis" of array 10. There are many combinations of field and gradient data that can be developed for array 10. However, in general, an embodiment of the invention should contain at least one of each of the following "geometrical" and functional elements:

(1) A "Longitudinal Ranging Axis" (LRA) that is collinear with a primary symmetry axis (here denoted as the "S-Axis") of the array so that it is collinear with the bearing to a magnetic target when the S-Axis points toward the target. For array 10, TM sensors 11–13 lie along the LRA. The principal functions of the TM sensors on the LRA are to provide data that can be used for target localization. Specifically, the data are used to:

(i) develop the component (or projection) of the target position vector r that is along (i.e., parallel to) the S-axis, and (ii) uniquely determine the distance to the target, the position of the target relative to the sensor array, and the magnetic moment M of the target, when the S-Axis is pointed directly at the target.

(2) A "Transverse Ranging Plane" (TRP) that consists of an array of at least three (and preferably four) or more axes that are symmetrically disposed in a plane that is perpendicular to, and preferably geometrically centered on, the LRA. For array 10, the TRP is defined by TM sensors 14–17. In general, the TM sensors at the periphery of the TRP are preferably located at the vertices of a polygon in which opposing sides thereof are of equal length and parallel to one another (e.g., square, rectangle, hexagon, etc.) with the LRA passing through the geometric center thereof. The TM sensors on the TRP are used to develop multiple complete gradient tensors $G_{Ti}$ and their contractions $C_{Ti}$ to:

(i) determine the relative values of the Y,Z components of target position r transverse to the S-Axis (i.e., the X-Axis in the illustrated embodiment), and (ii) determine the relative magnitude and components of the target's magnetic moment M.

(3) A "Magnetic Guidance Array" (MGA) that is composed of pairs of axes that are symmetrically disposed about the central symmetry S-axis and that correlate with the sensor system's XYZ coordinates and with the yaw (i.e., left turn-right turn), pitch (i.e., point up-point down) directions of three dimensional sensor platform motion. For array 10, a preferred MGA uses TM sensors 12 and 14–17, although another MGA could use TM sensors 11 and 14–17. The primary function of each MGA is to provide data sets that can be used by a vehicle controller (not shown) to precisely align the array's LRA/S-Axis with the relative bearing to a magnetic target or to guide a maneuverable sensor platform (supporting the array) toward a target.

(4) A sensor processor 18 comprised of analog and digital electronic circuitry, microprocessor, input/output devices, etc. Processor 18 is coupled to each of TM sensors 11–17 to receive sensed magnetic data therefrom. However, for clarity of illustration, only TM sensor 11 is shown coupled to processor 18. Functions of processor 18 include data acquisition, signal processing for target detection and localization, and the outputting of information to a vehicle operator or robotic vehicle controller.

Figure 2:
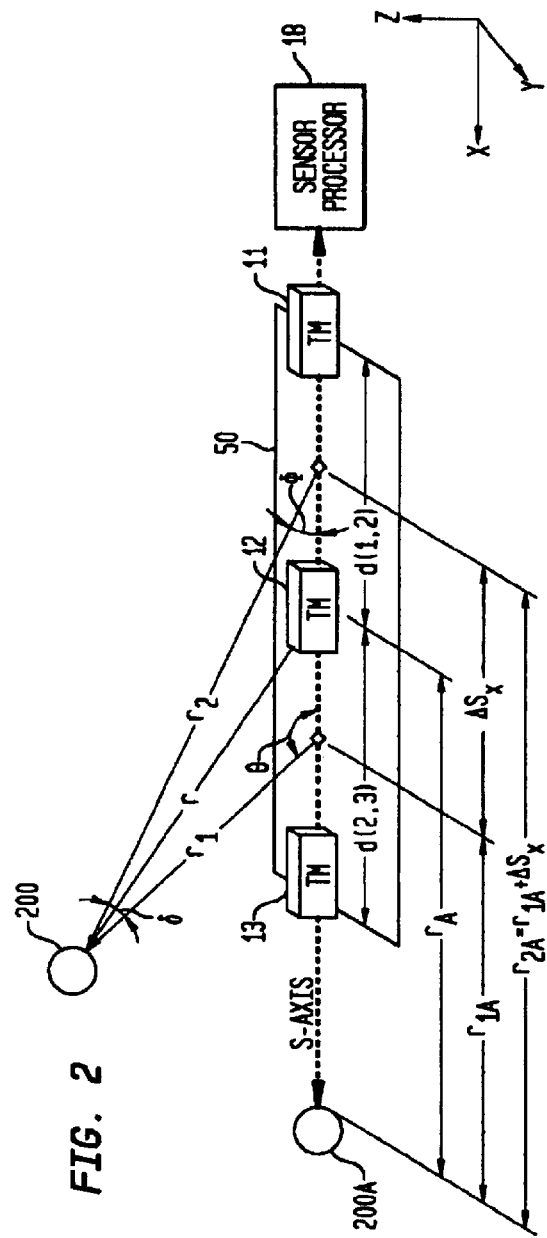
FIG. 2 is an isolated schematic view of the sensors that comprise the Longitudinal Ranging Axis (LRA) pointed at a target in accordance with the present invention.

The above-described elements will now be described in further detail. Referring additionally to FIG. 2, the Longitudinal Ranging Axis or LRA consists of at least three triaxial magnetometers (e.g., TM sensors 11–13) mounted on a rigid, non-magnetic mounting structure 50 with their XYZ axes mutually parallel and in parallel with the overall sensor system XYZ coordinates. The X-axes of TM sensors 11–13 are collinear with the S-Axis of sensor array 10. In essence, TM sensors 11/12 and TM sensors 12/13 comprise a set of two parallel and collinear single-axis gradiometers that are separated by a distance $\Delta S_x = \Delta X = d(1,2) = d(2,3)$. For convenience of illustration, the distances $d(1,2) = d(2,3) = (0.5)d(1,3)$. The distances $r_1$ and $r_2$ to a target 200 are measured from the centers of the respective gradiometers formed by TM sensors 11/12 and TM sensors 12/13. The distance r is the distance from target 200 to TM sensor 12 which is at the center of sensor array 10. In general, the particular collinear sensor configuration of the LRA provides a method for unambiguous determination of the particular half-space (i.e., fore or aft of the TRP) where target 200 is located.

For the above configuration, the gradient contraction-based STAR approach can only measure the relative value of component of target position vector r that is parallel to the S-axis, that is, the X-component of r. The STAR method described in the previously-referenced '610 patent generally requires a self-consistent approach to solving multiple inverse trigonometric equations. While this is not particularly difficult mathematically, the use of orientation-dependent partial gradient contractions may result in ambiguities with regard to target location and magnetic moment.

One of the unique achievements of this invention is that it facilitates an improved DLC modality that can be used to unambiguously measure both the target's position vector r and the components of its magnetic moment M. The primary target ranging and dipole moment classification function of the LRA is enabled when the S-axis is collinearly aligned with the relative bearing to target 200. (Alignment is done with the help of the MGA as will be explained later herein.) This proper alignment condition is illustrated in FIG. 2 by target 200A that is aligned with the LRA defined by the aligned X coordinate B-field sensing axes of TM sensors 11, 12 and 13 where the above described "$r_1$, $r_2$ and r distances" to target 200A are illustrated and labeled as $r_{1A}$, $r_{2A}$ and $r_A$, respectively.

Once properly aligned, the target ranging and dipole moment classification function is performed by the application of the STAR method which provides a measure of the vector components of r that are parallel to the triangulation baseline $\Delta S_x$. In FIG. 2, $\Delta S_x$ is parallel to the X-direction so only the X-component of r can be measured. (In general, the Y and Z components of r are triangulated from baselines in the TRP as will be described later below.) Application of the STAR method to the LRA involves the following:

1) Measurement of the gradient components for the single-axis gradiometers formed by TM sensor pairs 11/12, 12/13 and 11/13. To simplify the nomenclature in the remainder of the description, distance between any two TM sensors will be referenced using only the rightmost digit of a TM sensor's reference numeral. Similarly, when a value/quantity is referenced to a particular TM sensor or sensor pair, only the rightmost digit of the TM sensor's reference numeral will be used, e.g., $B_{X1}$ is equal to the magnetic field component in the X-direction that is measured by TM sensor 11. Thus, for each pair of TM sensors, the following sets of components are measured.

(i) For TM sensor pair 11/12:

$$(\Delta B_X/\Delta X)_{1,2}, (\Delta B_Y/\Delta X)_{1,2}, (\Delta B_Z/\Delta X)_{1,2}$$

where $(\Delta B_X/\Delta X)_{1,2}=(B_{X2}-B_{X1})/[d(2,1)]$, etc.

(ii) For TM sensor pair 12/13:

$$(\Delta B_X/\Delta X)_{2,3}, (\Delta B_Y/\Delta X)_{2,3}, (\Delta B_Z/\Delta X)_{2,3}$$

where $(\Delta B_X/\Delta X)_{2,3}=(B_{X3}-B_{X2})/[d(3,2)]$, etc.

(iii) For TM sensor pair 11/13:

$$(\Delta B_X/\Delta X)_{3,1}, (\Delta B_Y/\Delta X)_{3,1}, (\Delta B_Z/\Delta X)_{3,1}$$

where $(\Delta B_X/\Delta X)_{3,1}=(B_{X3}-B_{X1})/[d(3,1)])$ etc.

2) Construction of the partial gradient contractions $C_{1,2}$, $C_{2,3}$ and $C_{1,3}$ for TM sensor pairs 11/12, 12/13 and 11/13. The C-quantities are proportional to an "effective" magnetic moment parameter (M') divided by the fourth power of the respective distance to the target. Specifically, $$C_{1,2}=[(\Delta B_X/\Delta X)_{1,2}^2+(\Delta B_Y/\Delta X)_{1,2}^2+(\Delta B_Z/\Delta X)_{1,2}^2]^{0.5} \propto M'/r_{2A}^4$$

$$C_{2,3}=[(\Delta B_X/\Delta X)_{2,3}^2+(\Delta B_Y/\Delta X)_{2,3}^2+(\Delta B_Z/\Delta X)_{2,3}^2]^{0.5} \propto M'/r_{1A}^4$$

$$C_{1,3}=[(\Delta B_X/\Delta X)_{1,3}^2+(\Delta B_Y/\Delta X)_{1,3}^2+(\Delta B_Z/\Delta X)_{1,3}^2]^{0.5} \propto M'/r_A^4$$

3) Development of the primary ranging and classification function of the LRA. This requires that the S-axis be collinearly aligned with the relative bearing to target 200A (i.e., for a given sensor system location, the C quantities have their maximum values with $C_{2,3}>C_{1,2}$ and so the condition Y=Z=0 is fulfilled) which leads to the following results for XYZ components of r.

$$r_{2A}=r_{1A}+\Delta S_X$$

$$r_A=r_{1A}+\Delta S_X/2=X, \text{ and}$$

$$C_{2,3}/C_{1,2}=(r_{2A}/r_{1A})^4=[(r_{1A}+\Delta S_X)/r_{1A}]^4$$

Therefore, $$r_{1A}+\Delta S_X=r_{1A}(C_{2,3}/C_{1,2})^{0.25} \text{ so that}$$

$$r_{1A}=\Delta S_X/[(C_{2,3}/C_{1,2})^{0.25}-1].$$

Thus, accurate alignment of the LRA with the target direction allows the improved STAR process to provide unambiguous values for X, Y and Z where $$X=r_{1A}+0.5\Delta S_X=\Delta S_X/[(C_{2,3}/C_{1,2})^{0.25}-1]+0.5\Delta S_X,$$

Y=0 and Z=0. Also, the partial gradient type effective moment M' can be written as $$M'=r_{1A}^4(C_{2,3})=\{\Delta S_X/[(C_{2,3}/C_{1,2})^{0.25}-1]\}^4(C_{2,3}).$$

In general, the effective moment M' that is obtained from the partial-gradient-contraction-based STAR method is not a good quantity for efficient target classification. However, when the sensor array's X-axis points directly at the target, the true components of M in the sensor frame can be obtained through substitution of $X=r_A$ and Y=Z=0 into the gradient equations for displacements in the X-direction (see equation (8)) thereby yielding $$\partial B_X/\partial x=[3x(3r_A^2-5x^2)M_x+3y(r_A^2-5x^2)M_y+3z(r_A^2-5x^2)M_z]r_A^{-7}$$

$$M_X=-X^4(\partial B_X/\partial x)/6 \approx -X^4(\Delta B_X/\Delta x)/6$$

$$\partial B_Y/\partial x=[3y(r_A^2-5x^2)M_x+3x(r_A^2-5y^2)M_y-15xyzM_z]r_A^{-7}$$

$$M_Y=X^4(\partial B_Y/\partial x)/3 \approx X^4(\Delta B_Y/\Delta x)/3$$

$$\partial B_Z/\partial x=[3z(r_A^2-5x^2)M_x-15xyzM_y+3x(r_A^2-5z^2)M_z]r_A^{-7}$$

$$M_Z=X^4(\partial B_Z/\partial x)/3 \approx X^4(\Delta B_Y/\Delta x)/3$$

Thus, this invention's improved or precise STAR method provides a uniquely simple and direct determination of all six unknown XYZ components of target position r and dipole moment M.

The above-described target localization and classification parameters are all relative to the sensor platform's XYZ coordinate system. If it is desired to obtain these DLC parameters in some external coordinate system, an independent platform navigation system must be provided so that the relative parameters can be converted to their respective values in the external coordinate system. To obtain relative values of $r_1$, $r_2$ and r for the general case shown in FIG. 2 where angles and distances to the target 200 are unknown involves the following:

$$C_{1,2}=M'/r_2^4,$$

$$C_{2,3}=M'/r_1^4, \text{ and}$$

$$r_2=r_1(C^{2,3}/C_{1,2})^{1/4}.$$

The quantity for $r_2$ is substituted in the Law of Cosines and the following set of equations are solved for $r_1$, $r_2$, r, δ, φ and θ as follows:

$$\theta=\cos^{-1}[r_2^2+\Delta S_x^2-r_1^2]/2r_2\Delta S_x$$

$$\phi=\cos^{-1}[r_2^2+\Delta S_x^2-r_2^2]/2r_1\Delta S_x$$

$$\delta=\cos^{-1}[r_2^2+r_1^2-\Delta S_x^2]/2r_2r_1$$

where δ+φ+θ=π (radians)=180°, $$\sin(\delta/\Delta S_x)=\sin(\phi/r_1)=\sin(\theta/r_2),$$

$$|r_2-r_1| \leq \Delta S_x, \text{ and}$$

$$r=0.5(r_1+r_2).$$

Ambiguities in the solution of the above set of inverse trigonometric equations can be removed by using the aforementioned precise STAR method to initially determine an accurate set of component values for r and M. Solutions of the above set of equations will actually produce a "family" of possible values for $r_1$, $r_2$, r and M'. In order to reduce the ambiguities in target localization and classification for the general case (i.e., where the LRA is not aligned with the target), this invention uses a set of TM sensors arranged in a plane that is transverse to the LRA.

The configuration of the Transverse Ranging Plane (or TRP) that corresponds to FIG. 1 is shown separately in two views in FIGS. 3A and 3B, and the operation of the TRP will be described with the aid of FIGS. 4–6. The present invention's use of a centrally located TM sensor (i.e., TM sensor 12) results in enhanced symmetry of design with significant improvements in DLC performance that allow development of a unique, fully rotationally-invariant STAR method of target moment classification. The $C_T$'s derived using the TRP are fully rotationally-invariant quantities that can be used for more robust triangulation of the Y and Z components of target location with greater immunity to the effects of sensor platform rotation than the approach used in the '610 patent. In particular, the value of the effective magnetic moment that is measured by the TRP does not depend on the heading of the sensor platform with respect to the dipole target. Therefore, the present invention provides for a much more accurate determination of a target's dipole moment M. Furthermore, the use of the full complement of gradient tensor components also allows a unique application of the STAR method for determination of XYZ components of the target anomaly field BA. Still further, the invention's sensor system design could be used to resolve inefficiencies that have limited the range of practical applications for prior-art tensor gradiometry.

Figure 3A:
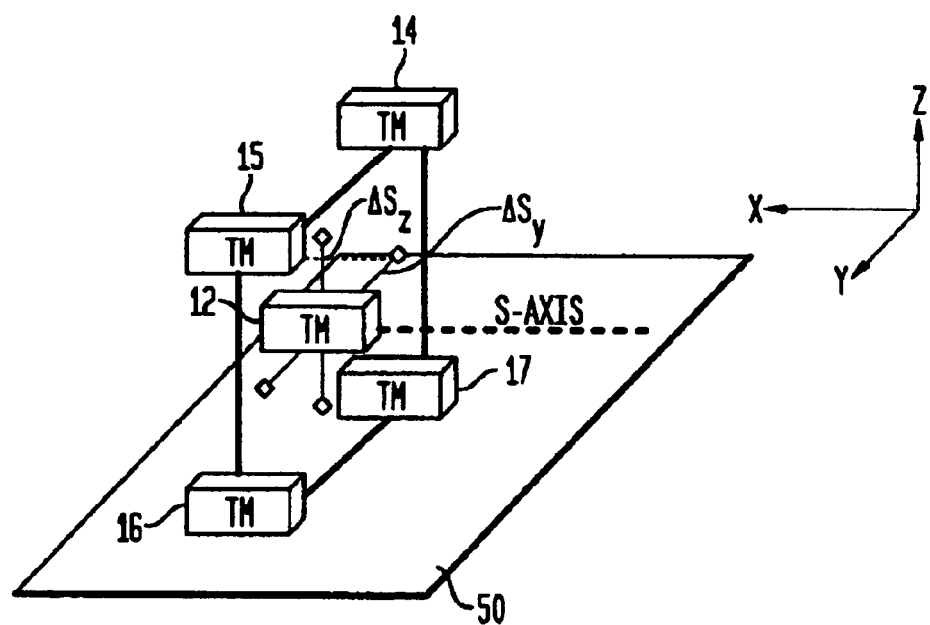
FIG. 3A is an isolated schematic view of the sensors that comprise the Transverse Ranging Plane (TRP) in accordance with the present invention.
Figure 3B:
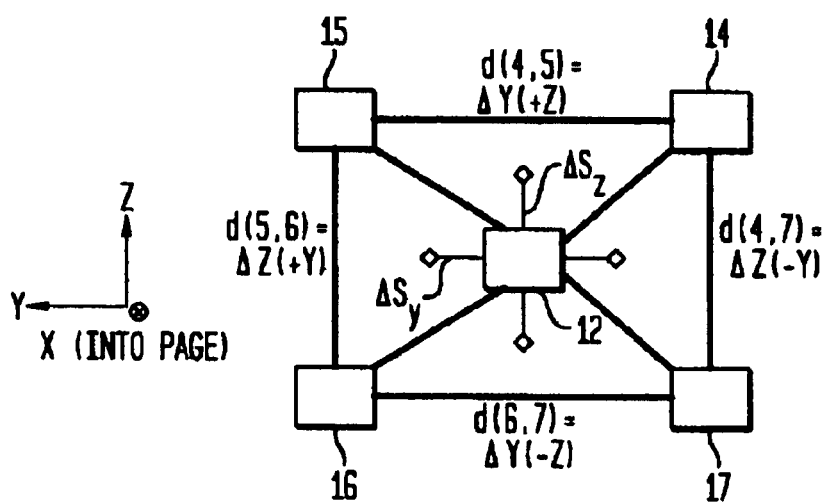
FIG. 3B is a head-on plan view of the sensors that comprise the TRP.

FIGS. 3A and 3B present an isolated view of the 5-TM sensor, planar TRP array used by array 10 (FIG. 1) and a set of orthogonal triangulation baselines $\Delta S_Y$ and $\Delta S_Z$ that can be used to triangulate the position of a target. The baselines $\Delta S_Y$ and $\Delta S_Z$ are derived from rotationally-invariant contractions of the full nine-component gradient tensor.

Several combinations of TM sensors and TRP configurations can be used to develop this invention's method of using a plurality of full, nine-component gradient tensors $G_T$ and their contractions $C_T$ to develop improved applications of the STAR method of target DLC. In the illustrated example, the $C_T$'S derived using the TRP are fully rotationally-invariant quantities that constitute endpoints 20/22 and 24/26 of the triangulation baselines $\Delta S_Y$ and $\Delta S_Z$, respectively. Such baselines provide this invention with its improved capability for triangulation of the target position vector r. In particular, the $C_T$-based STAR method provides greater immunity to the effects of sensor platform rotation than the prior art and a much improved capability to accurately determine a target's effective magnetic source strength M'. The use of $C_T$-based STAR parameters effectively limits the possible range of values of M' to between 4.2 to 7.3 times the true magnetic moment value M, so that $(M'/7.3) \leq M \leq (M'/4.2)$.

FIG. 3B illustrates a head-on, planar view of the 5-TM sensor, planar TRP array embodiment of FIG. 1 (as seen from the position of TM sensor 11), and a set of rotationally-invariant triangulation baselines $\Delta S_Y$ and $\Delta S_Z$. The operation of the TRP will now be discussed with the aid of FIGS. 4 and 5.

FIGS. 4A, 4B, 4D and 4E depict four combinations of TM sensors of the TRP for which field measurements can be processed to develop four complete (nine-component) sets of gradient tensor components, their respective contractions, and two orthogonal sets of "triangulation baselines" $\Delta S_Z$ and $\Delta S_Y$. In each of FIGS. 4A, 4B, 4D and 4E, shaded TM sensors and solid lines respectively represent each gradiometer's field sensing elements and sensing axes. The complete gradient tensors provide the STAR method with an improved rotationally-invariant data set for:

(i) More accurate determination of the effective value of M,
(ii) More robust triangulation baselines for better application of the STAR method's self-consistent determination of the relative values of the Z and Y-components of the target position and the position vector r, and
(iii) Independent determination of the "X-column" (see equation (7)) components of the gradient tensor. Comparison of these components with the corresponding X-column components directly measured by the LRA provides this invention with a unique method for determination of the location of a sensor embodiment with respect to the far-field/near-field regions of target space.

Figure 4A:
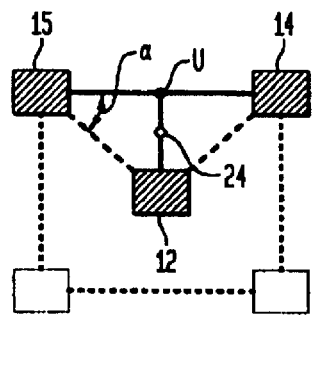
FIG. 4A is a head-on plan view of the TRP with the three sensors thereof that are shaded being indicative of the upper three-axis gradiometer.
Figure 4B:
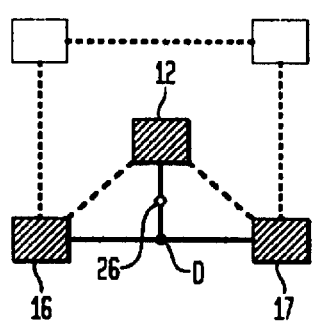
FIG. 4B is a head-on plan view of the TRP with the three sensors thereof that are shaded being indicative of the lower three-axis gradiometer.
Figure 4C:
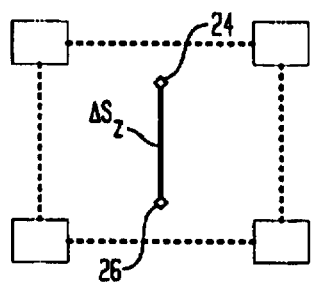
FIG. 4C is a head-on plan view of the TRP showing the Z-component triangulation baseline.
Figure 4D:
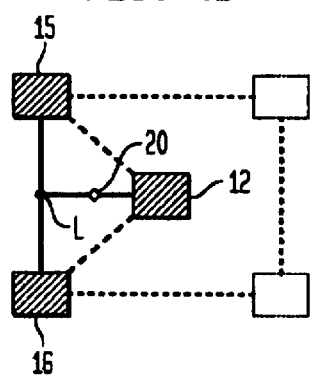
FIG. 4D is a head-on plan view of the TRP with the three sensors thereof that are shaded being indicative of the left three-axis gradiometer.
Figure 4E:
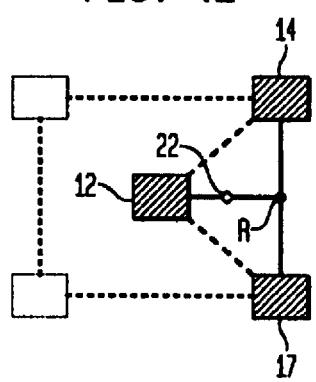
FIG. 4E is a head-on plan view of the TRP with the three sensors thereof that are shaded being indicative of the right three-axis gradiometer.
Figure 4F:
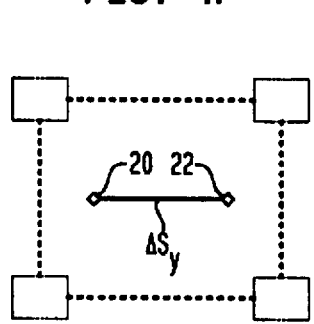
FIG. 4F is a head-on plan view of the TRP showing the Y-component triangulation baseline.
Figure 5:
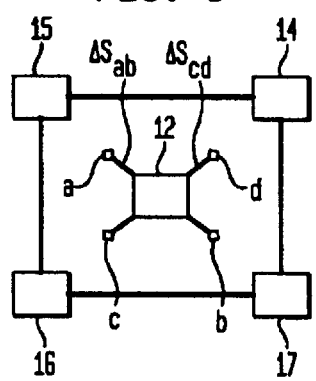
FIG. 5 is a head-on plan view of the TRP illustrating another set of two orthogonal triangulation baselines that can be developed in the present invention.

In FIG. 4A, TM sensors 12, 14 and 15 comprise an upper three-axis gradiometer. Differential field measurements from TM sensors 12/14/15 are used to form a complete, nine component gradient tensor $G_T$. The contraction $C_{T-24}$ of $G_{T-24}$ is a rotationally-invariant quantity that corresponds to point 24 defining the upper endpoint of the Z-axis triangulation baseline $\Delta S_Z$ as well as the geometrical center of the upper gradiometer array. In FIG. 4B, TM sensors 12, 16 and 17 comprise a lower three-axis gradiometer whose differential field measurements are used to form a complete, nine component gradient tensor and a complete, rotationally-invariant gradient contraction quantity $C_{T-26}$ that corresponds to point 26 defining the lower endpoint of the Z-axis triangulation baseline $\Delta S_Z$ as well as the geometrical center of the lower gradiometer array. FIG. 4C shows the Z-component triangulation baseline $\Delta S_Z$ that results from the combination of the above-described upper and lower gradiometer arrays. Similarly, as illustrated by FIGS. 4D, 4E and 4F, data from TM sensor sets 12/15/16 and 12/14/17 can be used to develop complete gradient contractions $C_T$ that correspond, respectively, to endpoints 20 and 22 of a triangulation baseline in the Y-direction or $\Delta S_Y$.

For the TRP shown in FIGS. 3A and 3B, construction of a complete gradient tensor $G_T$ is based on direct measurement of six gradient components in the Y and Z directions and the application of the tensor's symmetry properties in order to get the three gradient components (i.e., $\partial B_x/\partial x$, etc.) in the X-direction. This is because the components in the X-columns in equation (7) cannot be measured directly by TM sensors comprising the TRP. By way of example, a complete nine component gradient tensor for the upper three-axis gradiometer formed by TM sensors 12/14/15 will be described herein. Complete nine component gradient tensors for the other three-axis gradiometers formed by the TM sensors can be formed in a similar fashion.

As described above, the simplified nomenclature used herein to describe the distance between any two TM sensors uses only the rightmost digit of a TM sensor's reference numeral. Similarly, when a value/quantity is referenced to a particular TM sensor or sensor pair, only the rightmost digit of the TM sensor's reference numeral is used. Thus, for the upper three-axis gradiometer formed by TM sensors 12/14/15, TM sensors 14 and 15 are separated a distance $\Delta Y = d(4,5)$. The Y-column gradient components between TM sensors 14 and 15 can readily be formed by direct subtraction in the usual fashion. For example, $$(\partial B_x/\partial y)_{5,4} \approx \Delta B_x/\Delta y = (B_{X5} - B_{X4})/\Delta Y_{5,4},$$

$$(\partial B_y/\partial y)_{5,4} \approx \Delta B_y/\Delta y = (B_{Y5} - B_{Y4})/Y_{5,4}, \text{ and}$$

$$(\partial B_z/\partial y)_{5,4} \approx \Delta B_z/\Delta y = (B_{Z5} - B_{Z4})/\Delta Y_{5,4},$$

where $B_{X4}$ is the X-component of the magnetic field measured by TM sensor 14, $B_{X5}$ is the X-component of the magnetic field measured by TM sensor 15, etc. Referring to equation (7), by symmetry across gradient matrix diagonals, $$\Delta B_x/\Delta y = \Delta B_y/\Delta x.$$

The gradients in the Z-direction are best taken along a virtual axis consisting of the vertical line joining TM sensor 12 and the point "U" at the midpoint of the line joining TM sensors 14 and 15. The +Z-axis displacement between TM sensor 12 and point U is
$\Delta Z_{U,2}=(0.5)d(4,5)\tan(a)$ where $\alpha$ is the angle between the line joining TM sensors 14 and 15, and the line joining TM sensors 12 and 15. Furthermore, the field components of B at the point U are taken to be the average of the respective field values measured at TM sensor 14 and at TM sensor 15. That is, the field value at point U is equal to 0.5(field value at TM sensor 15+field value at TM sensor 14), so that $$B_{XU}=0.5(B_{X5}+B_{X4})$$

$$B_{YU}=0.5(B_{Y5}+B_{Y4})$$

$$B_{ZU}=0.5(B_{Z5}+B_{Z4})$$

Then, in the Z-direction, the gradient components between TM sensor 12 and point U are given by $$\partial B_x / \partial z \approx \Delta B_x / \Delta z$$
$$= (B_{XU} - B_{X2})/\Delta Z_{U,2} = [0.5(B_{X5} + B_{X4}) - B_{X2}]/\Delta Z_{U,2},$$

$$\partial B_y / \partial z \approx \Delta B_y / \Delta z$$
$$= (B_{YU} - B_{Y2})/\Delta Z_{U,2} = [0.5(B_{Y5} + B_{Y4}) - B_{Y2}]/\Delta Z_{U,2}, \text{ and}$$

$$\partial B_z / \partial z \approx \Delta B_x / \Delta z$$
$$= (B_{ZU} - B_{Z2})/\Delta Z_{U,2} = [0.5(B_{Z5} + B_{Z4}) - B_{Z2}]/\Delta Z_{U,2}.$$

Once again, referring to equation (7), by symmetry across gradient matrix diagonals $\Delta B_x/\Delta z = \Delta B_z/\Delta x$.

The gradient component $\Delta B_x/\Delta x$ can be constructed from the "traceless" relation discussed in equation (7), namely $$\partial B_x/\partial x = -(\partial B_y/\partial y + \partial B_z/\partial z) \text{ and}$$

$$\Delta B_x/\Delta x = -(\Delta B_y/\Delta y + \Delta B_z/\Delta z)$$
$$= -\{(\Delta B_{Y5} - B_{Y4})/\Delta Y_{5,4} + [0.5(B_{Z5} + B_{Z4}) - B_{Z2}]/\Delta Z_{U,2}\}$$

Finally, the complete nine component gradient tensor $G_{T-UPPER}$ for the upper three-axis gradiometer illustrated in FIG. 4A is formed by substitution of the above-described relationships in the gradient matrix $$G_{T-UPPER} = \begin{matrix} (X) & (Y) & (Z) \\ \Delta B_x/\Delta x & \Delta B_x/\Delta y & \Delta B_x/\Delta z \\ \Delta B_y/\Delta x & \Delta B_y/\Delta y & \Delta B_y/\Delta z \\ \Delta B_z/\Delta x & \Delta B_z/\Delta y & \Delta B_z/\Delta z \end{matrix}$$

The corresponding gradient contraction $C_{T-24}$ for point 24 of the gradiometer subset comprised by TM sensors 12/14/15 is the square root of the sum of squares of the matrix elements of $G_{T-UPPER}$. The procedure for construction of nine component tensors and the respective gradient contractions for the other three-axis gradiometer subsets of FIGS. 4B, 4D and 4E is analogous to the above-described procedure.

Another set of orthogonal triangulation baselines can be generated from the TM sensors of the TRP illustrated in FIGS. 3A and 3B. Specifically, as illustrated in the planar view of the TRP shown again in FIG. 5, the three-axis gradiometers formed by TM sensors 14/15/16 and 14/16/17 can be used to generate the endpoints of a triangulation baseline $\Delta S_{ab}$, and the three-axis gradiometers formed by TM sensors 15/16/17 and 14/15/17 can be used to generate the endpoints of a triangulation baseline $\Delta S_{cd}$ that (for a square TRP) is orthogonal to $\Delta S_{ab}$. Development of full, nine-component gradient tensors, their contractions and application of the STAR method are similar to the respective procedures that were followed for $\Delta S_Y$ that is orthogonal to $\Delta S_X$.

The design of the present invention's Magnetic Guidance Array (MGA) provides for development of partial and complete gradient-contraction-based Primary Guidance Parameters (PGP) that will efficiently guide the invention's sensor system to a magnetic target. The partial gradient contraction-type PGPs are derived from symmetrically disposed, equal length and parallel "sides" of the TRP. This symmetry compensates for certain sensor-target angular orientation effects which can affect the target homing efficiency of a partial-gradient-contraction-based magnetic guidance system.

At a given point in space, the value of a partial gradient contraction C has the following dependencies on factors related to the distance and angular orientation of the measurement axis relative to the target position and the magnetic anomaly field $B_A$:

1) At a given point in the far field space, the magnitude of the partial gradient contraction C measured by a single-axis gradiometer is proportional to the inverse fourth power of the distance r between the center of the axis and the target, that is, $C \propto r_{-4}$.

2) The magnitude of the partial gradient contraction C that is measured by a given axis is a monotonic function of the magnitude of the projection of the measurement axis length d in the direction of r, that is,
$C \propto [K_\theta + d|\cosine \theta|]$ where $\theta$ is the relative angle between the directions of d and r, and $K_\theta$ is a positive non-zero parameter included to account for the fact that C doesn't go to zero when cosine $\theta=0$.

3) The magnitude of C that is measured by a given axis is a function of the projection of d in a direction perpendicular to the local anomaly field $B_A$ direction, that is, $C \propto [F_\phi + d]\sine \phi|]$ where $\phi$ is the relative angle between d and $B_A$.

Figure 6:
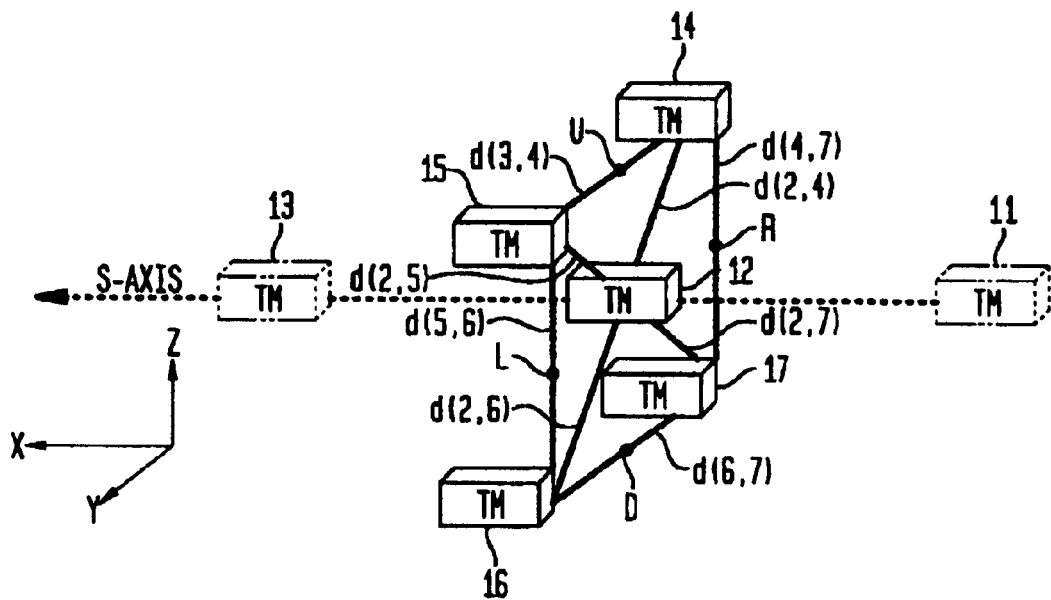
FIG. 6 is a schematic view of the TRP annotated for use in describing a Magnetic Guidance Array (MGA) in accordance with the present invention.

FIG. 6 shows an embodiment of an MGA for the sensor configuration of FIG. 1. Specifically, the MGA is an array of paired sets of symmetrically disposed, equal length and parallel single-axis gradiometers formed by appropriate combinations of TM sensors 12/14/15/16/17 of the TRP. The principal function of an MGA is to provide PGPs for alignment of the S-Axis/LRA with the target direction and to develop signals that can be used to control the motion of the sensor platform toward the target. The MGA's design exploits the symmetry properties of partial and total gradient contractions to provide the invention with a unique, three-dimensional capability both for "aiming at the target" and for homing in on the target.

The symmetries of the illustrated embodiment are particularly appropriate for using the STAR method for the development of two types of magnetic guidance parameters, namely, 1) Complete nine-component gradient contractions ($C_T$), and 2) Partial three-component gradient contractions ($C_t$). The development of $C_T$-type parameters using the STAR method has been previously described herein with reference to FIGS. 4 and 5. The use of $C_T$ parameters for magnetic guidance and sensor system aiming will be discussed further below in conjunction with FIG. 7. Therefore, the present discussion will focus on the development and use of partial gradient contractions from single-axis combinations of TM sensors of the MGA/TRP.

In FIG. 6, solid lines connecting TM sensors represent axes whose data can be used to construct Primary Guidance Axes (PGAs). Specifically, TM sensors 14/17 comprise a right (R) PGA, TM sensors 15/16 comprise a left (L) PGA, TM sensors 14/15 comprise an up (U) PGA, and TM sensors 16/17 comprise a down (D) PGA. If partial gradient contraction data from sets of single axes are to be used for efficient three-dimensional guidance, it is important that "opposing" (i.e., up-down or left-right) PGAs be constructed to be of equal length and to be mutually parallel. That is, it is important that the length of the right and left PGAs are equal to and parallel to one another, and that the upper and lower PGAs are equal to and parallel to one another. Consequently, a preferred embodiment for the invention's MGA is a polygon having opposing sides that are of equal length and parallel to one another. Note also that TM sensors 12/14 and 12/16, and TM sensors 12/15 and 12/17 also comprise sets of single axis PGAs that can be used to control sensor system motion in the directions of the diagonals of the MGA.

The following paragraphs describe the development and use of B-field and gradient data from the R-L and U-D guidance axes of the MGA. The data are combined in a set of equations that yields the PGPs Cu, CD, CR and CL for control of sensor system motion in the pitch (U-D) and yaw (R-L) directions.

$$C_U=[(B_{X5}-B_{X4})^2+(B_{Y5}-B_{Y4})^2+(B_{Z5}-B_{Z4})^2]^{0.5}/d(5,4)$$

$$C_D=[(B_{X6}-B_{X7})^2+(B_{Y6}-B_{Y7})^2+(B_{Z6}-B_{Z7})^2]^{0.5}/d(6,7)$$

$$C_L=[(B_{X5}-B_{X6})^2+(B_{Y5}-B_{Y6})^2+(B_{Z5}-B_{Z6})^2]^{0.5}/d(5,6)$$

$$C_R=[(B_{X4}-B_{X7})^2+(B_{Y4}-B_{Y7})^2+(B_{Z4}-B_{Z7})^2]^{0.5}/d(4,7)$$

Figure 7:
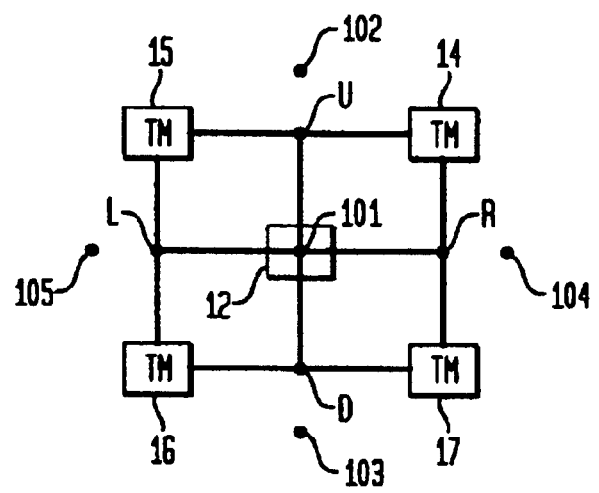
FIG. 7 is a head-on plan view of the MGA.

The use of a set of orthogonal partial-gradient-based PGPs from the MGA will now be described with the aid of FIG. 7. The following examples relate some relative target-sensor positions to corresponding sets of PGPs that are developed by the MGA. In the following, the orientation of the sensor system's S-Axis/LRA will be described relative to a target at locations 101, 102, 103, 104 or 105.

If the target is at location 101, $C_U=C_D$ and $C_R=C_L$ which means that the sensor array is headed directly at a target. Data from the LRA provides additional alignment criteria, i.e., the afore-mentioned LRA parameters $C_{2,3}$ and $C_{1,2}$ have their maximum values (for the given sensor array location) and that $C_{2,3}>C_{1,2}$. That is, the S-Axis and LRA are pointed directly at the target. If the target is at location 102, $C_U>C_D$ and $C_R=C_L$ which means that the sensor array is headed toward a target located directly above the S-Axis of the array. If the target is at location 103, $C_U<C_D$ and $C_R=C_L$ which means that the sensor array is headed toward a target located directly below the S-Axis. At location 104, $C_R>C_L$ and $C_U=C_D$ which means that the sensor array is at the level of the target that is located directly to the right of the S-Axis. Finally, at location 105, $C_R<C_L$ and $C_U=C_D$ which means that the sensor array is at the level of the target that is located directly to the left of the S-Axis.

Sets of partial-gradient-based PGPs can also be constructed from linear three-TM sensor combinations along the diagonals of the MGA. Specifically, the following PGPs can be formed $$C_{2,4}=[(B_{X2}-B_{X4})^2+(B_{Y2}-B_{Y4})^2+(B_{Z2}-B_{Z4})^2]^{0.5}/d(2,4)$$

$$C_{2,6}=[(B_{X2}-B_{X6})^2+(B_{Y2}-B_{Y6})^2+(B_{Z2}-B_{Z6})^2]^{0.5}/d(2,6)$$

$$C_{2,5}=[(B_{X2}-B_{X5})^2+(B_{Y2}-B_{Y5})^2+(B_{Z2}-B_{Z5})^2]^{0.5}/d(2,5)$$

$$C_{2,7}=[(B_{X2}-B_{X7})^2+(B_{Y2}-B_{Y7})^2+(B_{Z2}-B_{Z7})^2]^{0.5}/d(2,7)$$

To simplify the nomenclature, note that $C_{2,4}$ is indicative of the partial gradient contraction for the single-axis gradiometer formed by TM sensors 12/14 and that d(2,4) is the length of the axis between TM sensors 12/14; that $C_{2,6}$ is indicative of the partial gradient contraction for the single-axis gradiometer formed by TM sensors 12/16 and that d(2,6) is the length of the axis between TM sensors 12/14; etc.

The MGA/TRP of a preferred sensor embodiment has d(2,4) equal and parallel to d(2,6), and d(2,5) equal and parallel to d(2,7). Therefore, $C_{2,4}$ and $C_{2,6}$ constitute an opposing set of PGPs that are symmetrically situated about the S-axis/LRA. Likewise, $C_{2,5}$ and $C_{2,7}$ constitute another set of PGPs which, for a square MGA, are perpendicular to the first set. Therefore, the PGPs developed along the diagonals of a square MGA can also be used in a manner equivalent to the use of the $C_U=C_D$ and $C_R=C_L$ guidance parameters. However, as mentioned previously, the MGA geometry can be based on any polygon and is not limited to square arrays.

Note that partial gradient based PGPs will provide an efficient, easily calculated guidance modality for the invention. However, partial gradient based PGPs are orientation-dependent and are at a relative minimum when the LRA is pointing directly at the target. In contrast, PGPs derived from total gradient contractions provide inherently stronger signals that are independent of sensor platform orientation. The use of total-gradient PGPs is described further below with the aid of FIGS. 8 and 9.

Figure 8:
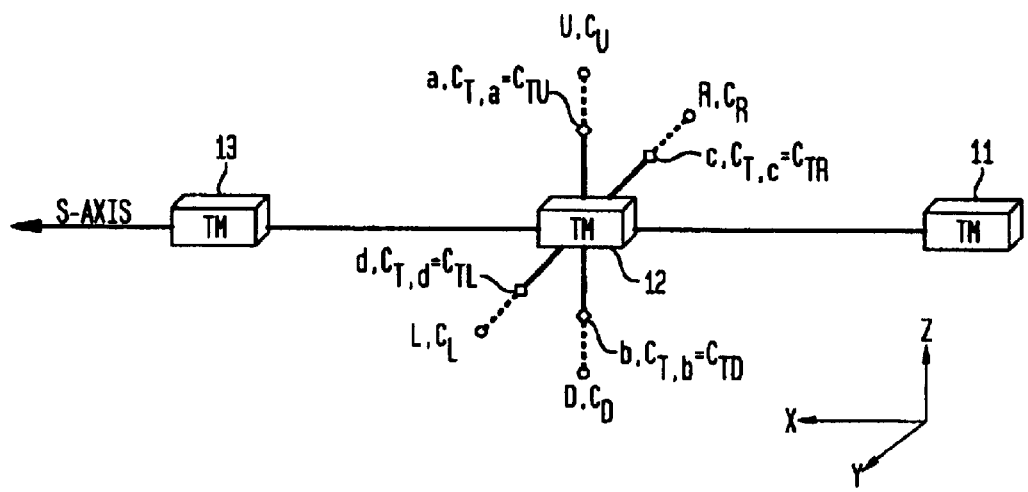
FIG. 8 is an isolated schematic view of the sensors that comprise the LRA with the figure being annotated to show the geometric locations associated with guidance parameters determined in accordance with the present invention.

FIG. 8 will be used to describe a set of PGPs based on total gradient contractions. If the sensor embodiment has the appropriate symmetries, the same $C_T$-type parameters (developed for the STAR method of target localization using triangulation baselines) can be used to control sensor platform motion in pitch and yaw. Control of platform "roll" around the S-axis can be accomplished with the use of an orientation sensor such as the TMA devices described in the '610 patent. For example, a TMA device could be used in place of TM sensor 12.

The points referenced by the letters U, D, L and R refer to the midpoints of the respective lines joining TM sensors 14/15, 16/17, 15/16 and 14/17 that were used above (FIG. 7) for the derivation of the respective partial gradient type PGPs, i.e., $C_U$, $C_D$, $C_R$ and $C_L$. The points referenced by a sequence of letters such as "a, $C_{T,a}=C_{TU}$" are interpreted as follows:

(i) The first letter (e.g., "a") refers to an endpoint of a triangulation baseline;
(ii) $C_{T,a}$ represents the total gradient contraction at point a; and
(iii) $C_{TU}$ is identical to $C_{T,a}$.

This nomenclature change is made to indicate explicitly that, for sensor system guidance and control, $C_{TU}$ represents an upper PGP for control of the sensor array's pitch relative to the target. FIG. 8 also shows the geometrical relation of the partial gradient based PGPs such as $C_U$ relative to the respective total gradient based PGPs such as $C_{TU}$.

The total gradient contraction PGPs $C_{TU}$, $C_{TD}$, $C_{TR}$ and $C_{TL}$ are used for sensor array guidance and LRA alignment in exactly the same way that the partial gradient type PGPs $C_U$, $C_D$, $C_R$ and $C_L$ are used. For example, when $C_{TU}=C_{TD}$, $C_{TR}=C_{TL}$, and the LRA parameters $C_{2,3}$ and $C_{1,2}$ have their relative maxima while fulfilling $C_{2,3}>C_{1,2}$, the sensor array is headed directly at a target with the array's S-Axis and LRA pointed directly at the target. When $C_{TU}>C_{TD}$ and $C_{TR}=C_{TL}$, the sensor array is headed toward a target located directly above the array's S-Axis. When $C_{TU}<C_{TD}$ and $C_{TR}=C_{TL}$, the sensor array is headed toward a target located directly below the S-Axis. When $C_{TR}>C_{TL}$ and $C_{TU}=C_{TD}$, the sensor array is at the level of a target located directly to the right of the S-Axis. Finally, when $C_{TR}<C_{TL}$ and $C_{TU}=C_{TD}$, the sensor array is at the level of a target located directly to the left of the S-Axis.

Figure 9:
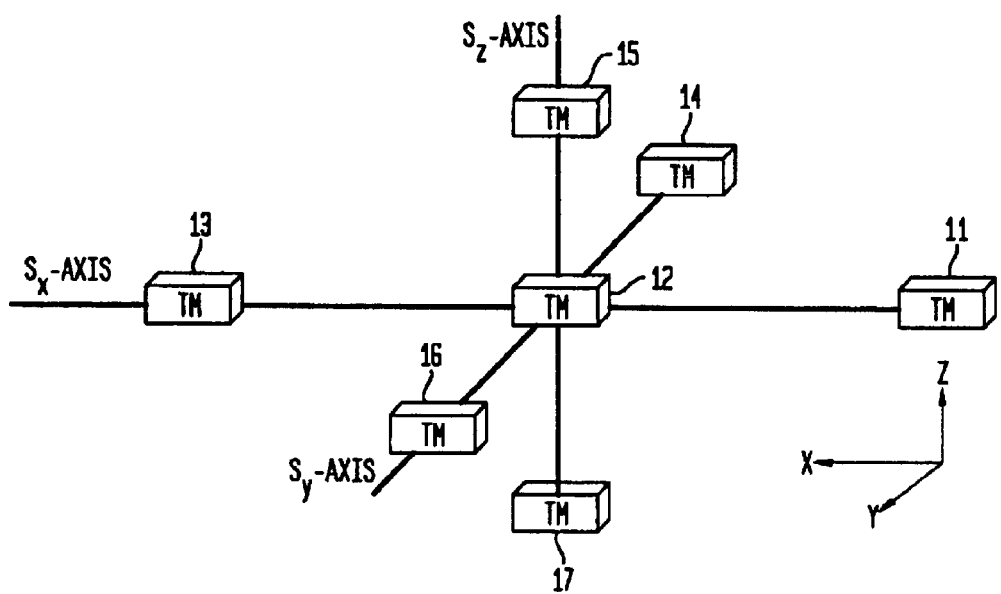
FIG. 9 is a schematic view of another embodiment of a seven sensor array in accordance with the present invention.

FIG. 9 illustrates another embodiment of a 7-TM sensor array similar in appearance to that shown in FIG. 1, but with some additional advantages. Compared to FIG. 1, the FIG. 9 configuration has the positions of TM sensors 14, 15, 16 and 17 rotated 45° around the line joining TM sensors 11, 12 and 13. This has the effect of developing three orthogonal, 3-TM sensor LRAs along the XYZ coordinate directions. That is, the rotated sensor arrangement results in a system with three equivalent symmetry axes $S_X$, $S_Y$ and $S_Z$, and three equivalent 3-TM sensor LRAs along the sensor system's XYZ coordinates. This configuration more easily allows the powerful ranging and target classification functions of the LRA to be performed in all three coordinate directions. In addition, the 3-TM sensor LRA's data can be used to develop partial gradient type PGPs of the type described for the diagonal axes shown in FIG. 7. Partial gradient contraction-based LRAs in the X, Y and Z-directions are respectively defined by TM sensors 11/12/13, 14/12/16 and 15/12/17. In a manner similar to that described for the LRA of FIG. 2, the TM sensor measurements can be combined to determine the following:

1) Guidance parameters for the $S_X$, $S_Y$ and $S_Z$ axes,
2) Partial gradients and their respective partial contractions along the $S_X$, $S_Y$ and $S_Z$ axes,
3) Partial gradient type triangulation baselines in X, Y and Z directions,
4) XYZ components of r (using the STAR method), and
5) Value of M (using equation (8)).

In addition, complete nine-component gradient tensors from multiple gradiometer sets located in each coordinate plane (X-Y, X-Z and Y-Z) and their rotationally invariant contractions can be easily constructed and used to form an orthogonal array of triangulation baselines. The XY, YZ and XZ coordinate plane sensors effectively constitute three orthogonal TRPS. Each baseline of the array will be parallel to a system coordinate axis. This arrangement allows development of two sets of orthogonal baselines. One set is determined by partial gradient contractions from the system's LRAs. The other set is determined by complete gradient contractions from the system's TRPs. By way of illustrative example, this approach will be described below for the XY plane.

For the XY plane, combinations of measurements from TM sensors 11, 12, 13, 14 and 16 can be used to construct complete nine-component gradients, their respective contractions and robust triangulation baselines along the $S_X$ and $S_Y$ axes. Likewise, for the YZ plane, combinations of measurements from TM sensors 12, 14, 15, 16 and 17 can be used to construct complete nine-component gradients, their respective contractions and robust triangulation baselines along the $S_Y$ and $S_Z$ axes. For example, in the direction of +Z in the Y-Z plane, TM sensors 12, 14, 15 and 16 form a convenient gradiometer array for determination of a total gradient and its contraction. The contraction parameter can serve both as an endpoint of a Z-axis triangulation baseline and as a PGP for control of sensor system pitch with respect to a target. Similar gradiometers, and their triangulation baselines and PGPs, can be developed for the lower, left and right directions of the Y-Z plane. The above approach can be repeated for each of the other planes.

For completeness, it again should be noted that single-axis guidance parameters are also readily developed from the XYZ LRAs of this embodiment. For example, along the Y-direction, partial gradient contractions from TM sensors 12/14 and 12/16 can be used to develop $C_R$ and $C_L$, respectively, for control of sensor yaw angle with respect to the target. Partial gradient contractions from TM sensors 12/15 and 12/17 can be used to develop $C_U$ and $C_D$, respectively, for control of sensor pitch angle with respect to the target. Similarly, single-axis guidance parameters can also be readily developed from the remaining LRAs.

Figure 10:
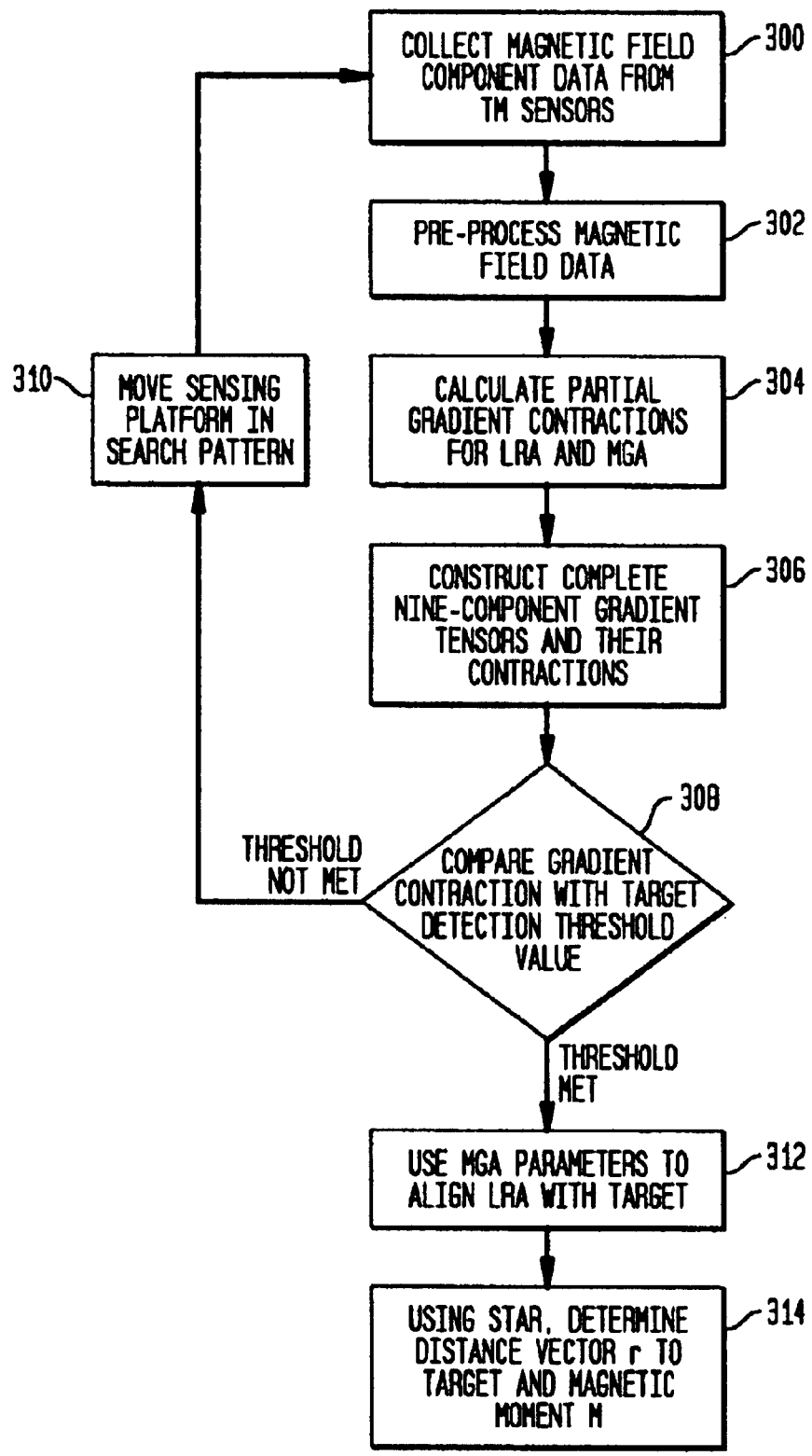
FIG. 10 is a flow diagram depicting the basic operation steps that can be used with the multi-axis magnetic anomaly sensing system of the present invention.

The general procedure for localization and characterization of magnetic targets using the sensor array of the present invention will now be described with the aid of the flowchart in FIG. 10. At step 300, XYZ magnetic field components are measured by each TM sensor. These data can be read and stored as would be well understood in the art. If necessary, the measured magnetic field data can be pre-processed at step 302 to have (i) field correction factors applied thereto as described in the '610 patent,
(ii) total field $B_T$ data calculated which, although not part of the present invention, can be useful for developing "pseudo-robust" target detection and directional target proximity sensing localization information with longer range than the gradient contraction-based information as described in the '610 patent, and
(iii) motion-corrected gradient components readings calculated for the sensor axes of the LRA, TRP and MGA "subsystems".

Next, at step 304, partial gradient contractions C are calculated for the LRA and MGA. Step 306 constructs complete nine-component tensors for the TRP(s) and calculates their contractions $C_T$ that will be used in step 308.

In the absence of a target, only the relatively constant Earth's background is measured. Since the background field is essentially constant, all gradient components measured by a perfect sensor system would be nearly zero. Consequently, all gradient contractions C should be close to zero. However, in a real (i.e., imperfect) measurement system, a certain non-zero level of errors and uncertainties will exist in any measurement process. For a real gradiometer, gradient imbalance errors, TM sensor drift, etc., can be lumped together and considered as "noise". The non-zero noise level ($\epsilon$) constitutes a threshold that must be exceeded before a target can be detected. Thus, in the absence of a target, $C_T<\epsilon$ where "$\epsilon$" is the small, non-zero target detection threshold level. Similarly, if the total field $B_T$ is to be used to aid in target detection, there will be a separate total field detection threshold that corresponds to the noise-limited resolution of the $B_T$ parameter.

Step 308 compares the $C_T$ values with their respective target detection threshold values, below which it is assumed that no target is present. Specifically, (i) If neither the total field threshold nor gradient contraction threshold is exceeded, the sensing platform is moved in accordance with a search pattern (step 310) and the above steps (starting with step 300) are repeated.
(ii) If the gradient contraction threshold is exceeded, the CT and C gradient contraction information is used at step 312 to point and guide the vehicle toward the target.

Note that if the total field threshold is exceeded, but there is no gradient contraction change, the above-mentioned pseudo robust total field sums (i.e., described in the '610 patent) could be used as an alternative to guide sensing platform toward the most likely target position.

Step 312 uses guidance/aiming parameters developed from the MGA and LRA parameters to precisely align the LRA with the direction of the target. Next, step 314 applies the present invention's precise STAR method to unambiguously determine the components of (i) r thereby precisely locating a magnetic target, and (ii) M thereby providing the necessary information for classification of the target.

In addition to the processing steps just described, the LRA and TRP data can be used to determine far-field/near-field condition of the sensing array relative to a target. Further, as described in detail above, the MGA and LRA data can be used to guide the sensing platform toward a target's position.

The advantages of the present invention are numerous. The magnetic anomaly sensing system is a symmetrical three-dimensional array of triaxial magnetometers (TM). The basic sensor system concept results in a symmetrical array of single-axis gradiometers such that for each single-axis gradiometer on one side of a sensor system's geometrical axis of symmetry, there is a "mirror-image" single-axis gradiometer on the other side of the symmetry axis. Likewise, combinations of two or more single-axis gradiometers form symmetrically located "complete gradiometers", each with its respective mirror image "twin" on the other side of a plane-of-reflection that contains a symmetry axis.

The design is particularly well-suited for the STAR method of DLC of magnetic targets. However, the design would also result in improvements to conventional, prior art gradiometer systems by providing data sets that would allow more effective and practical elimination of the target localization ambiguities that are inherent to the prior art's sensor system embodiments.

The present invention's method provides for DLC of magnetic objects using scalar contractions of magnetic gradient tensors. The method is based on the development of partial (three-component) and total (nine-component) contractions of magnetic anomaly gradient tensor parameters. The method develops and uses the following two types of parameters, to wit, (i) target ranging and classification parameters for determination of XYZ components of target position and magnetic moment, and (ii) magnetic guidance parameters that can be used by a mobile sensor system platform to home in on a target and/or align a sensor system's symmetry axis with the target position. The invention's method of development of pluralities of gradient-contraction-type parameters (and the development of "virtual axes") can be used to improve the DLC performance of two and three-dimensional sensor system embodiments.

The design and method of the invention will provide robust three-dimensional guidance for high-mobility sensing platforms such as autonomous free-swimming robotic vehicles, human divers, and unmanned aircraft. Consequently, the invention is applicable to a wide variety of commercial and military uses where improved and practical magnetic guidance capabilities can be used to precisely localize and home in on magnetic targets. Some important applications of the present invention include mine countermeasure applications involving the DLC of magnetic mines, localization and tracing of subterranean pipes and cables, localization of military targets such as tanks by unmanned aerial vehicles, magnetic aiming system for autonomously firing at a target, and localization of buried nuclear facilities using a variety of autonomous vehicles.

Figure 11:
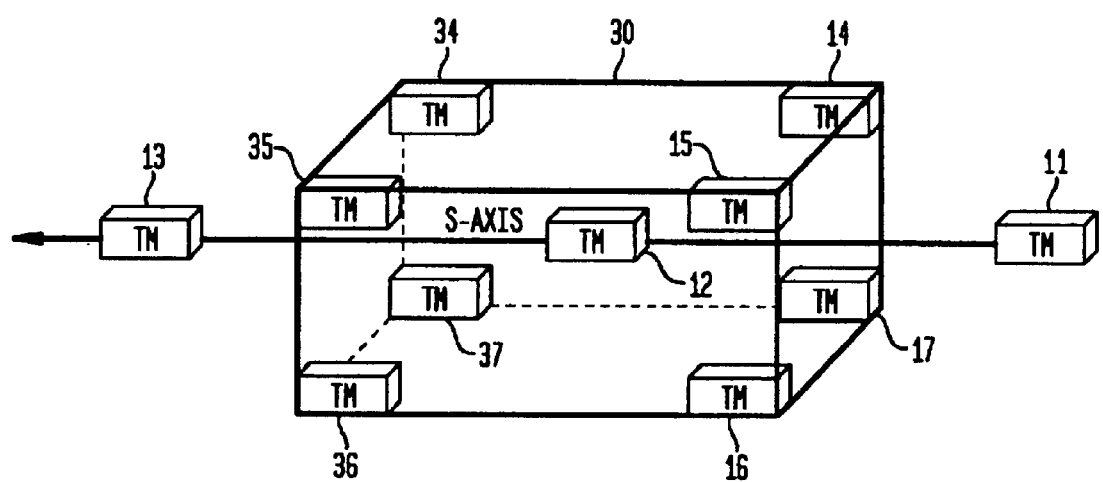
FIG. 11 is a schematic view of another multi-axis magnetic sensor array in accordance with the present invention.

Although the invention has been described relative to a specific embodiment thereof, there are numerous variations and modifications that will be readily apparent to those skilled in the art in light of the above teachings. For example, the present invention could have additional TM sensors arranged to form another TRP such as shown in FIG. 11 where one TRP is formed by TM sensors 14/15/16/17 and another TRP is formed by TM sensors 34/35/36/37 with TM sensor 12 positioned symmetrically therebetween. In other words, each TM sensor in a TRP is located at the vertex of a rectangular box referenced by numeral 30. This configuration provides for the development of spatially separate orthogonal triangulation baselines. Likewise, the invention's embodiments need not be restricted to square or rectangular geometries as many polygons with more than four sides possess the geometrical attributes that can be exploited by the present invention to provide robust DLC and guidance. It is therefore to be understood that, within the scope of the appended claims, the invention may be practiced other than as specifically described.

What is claimed as new and desired to be secured by Letters Patent of the United States is:

1. A magnetic anomaly sensing system, comprising:
    a plurality of triaxial magnetometer (TM) sensors with each of said TM sensors having X,Y,Z magnetic sensing axes, said plurality of said TM sensors arranged in a three-dimensional array with respective ones of said X,Y,Z magnetic sensing axes being mutually parallel to one another in said three-dimensional array;
    said three-dimensional array defining a geometry that (i) collinearly aligns at least three of said plurality of TM sensors in a spaced-apart fashion along an axis to form a plurality of single-axis gradiometers along one of said X,Y,Z magnetic sensing axes, and (ii) positions at least four of said plurality of TM sensors in a spaced-apart fashion in a planar array that is perpendicular to said axis; and
    processing means coupled to each of said plurality of TM sensors for generating
    (i) partial gradient contractions for each of said single-axis gradiometers, and
    (ii) partial gradient contractions, and complete gradient tensors and corresponding complete gradient contractions for gradiometers formed by said planar array, in order to provide data that can be used to
    (a) align said axis of said three-dimensional array with a magnetic target, and
    (b) once said axis is aligned with said magnetic target, uniquely determine (i) distance to said magnetic target, (ii) position of said magnetic target relative to said three-dimensional array, and (iii) a magnetic dipole moment of said magnetic target.

2. A magnetic anomaly sensing system as in claim 1 wherein three TM sensors from said plurality of TM sensors are collinearly aligned along said axis and are evenly spaced therealong, wherein a central one of said three TM sensors is centrally positioned between a remaining two of said three TM sensors.

3. A magnetic anomaly sensing system as in claim 2 wherein said planar array includes said central one of said three TM sensors.

4. A magnetic anomaly sensing system as in claim 3 wherein said planar array forms a square having one of said plurality of said TM sensors at each corner thereof.

5. A magnetic anomaly sensing system as in claim 4 wherein said central one of said three TM sensors lies at a center of said square.

6. A magnetic anomaly sensing system as in claim 2 wherein said planar array forms a square having one of said plurality of said TM sensors at each corner thereof.

7. A magnetic anomaly sensing system as in claim 6 wherein said axis passes through a center of said square.

8. A magnetic anomaly sensing system as in claim 7 wherein said planar array is positioned between said central one of said three TM sensors and one of said remaining two of said three TM sensors, said system further comprising a second planar array defined by at least four of said plurality of TM sensors with said second planar array being perpendicular to said axis and positioned between said central one of said three TM sensors and the other of said remaining two of said three TM sensors.

9. A magnetic anomaly sensing system as in claim 8 wherein said planar array and said second planar array are mirror images of one another relative to said central one of said three TM sensors.

10. A magnetic anomaly sensing system as in claim 3 wherein said planar array forms a polygon having one of said plurality of said TM sensors at each vertex thereof, said polygon having opposing sides that are of equal length and parallel to one another.

11. A magnetic anomaly sensing system as in claim 10 wherein said central one of said three TM sensors lies at a geometric center of said polygon.

12. A magnetic anomaly sensing system, comprising:
 a plurality of triaxial magnetometer (TM) sensors with each of said TM sensors having X,Y,Z magnetic sensing axes, said plurality of said TM sensors arranged in a three-dimensional array with respective ones of said X,Y,Z magnetic sensing axes being mutually parallel to one another in said three-dimensional array;
 said three-dimensional array defining a geometry that (i) collinearly aligns at least three of said plurality of TM sensors in a spaced-apart fashion along an axis to form a plurality of single-axis gradiometers along one of said X,Y,Z magnetic sensing axes, and (ii) positions at least four of said plurality of TM sensors in a spaced-apart fashion in a planar array that is perpendicular to said axis, said planar array defining pairs of single-axis gradiometers wherein each of said pairs is symmetrically disposed about said axis; and
 processing means coupled to each of said plurality of TM sensors for generating
 (i) partial gradient contractions for each of said single-axis gradiometers, and
 (ii) complete gradient tensors and corresponding complete gradient contractions for multi-axis gradiometers formed by said planar array,
in order to provide data that can be used to
 (a) align said axis of said three-dimensional array with a magnetic target, and
 (b) once said axis is aligned with said magnetic target, uniquely determine (i) distance to said magnetic target, (ii) position of said magnetic target relative to said three-dimensional array, and (iii) a magnetic dipole moment of said magnetic target.

13. A magnetic anomaly sensing system as in claim 12 wherein three TM sensors from said plurality of TM sensors are collinearly aligned along said axis and are evenly spaced therealong, wherein a central one of said three TM sensors is centrally positioned between a remaining two of said three TM sensors.

14. A magnetic anomaly sensing system as in claim 13 wherein said planar array includes said central one of said three TM sensors.

15. A magnetic anomaly sensing system as in claim 14 wherein said planar array forms a square having one of said plurality of said TM sensors at each corner thereof.

16. A magnetic anomaly sensing system as in claim 15 wherein said central one of said three TM sensors lies at a center of said square.

17. A magnetic anomaly sensing system as in claim 13 wherein said planar array forms a square having one of said plurality of said TM sensors at each corner thereof.

18. A magnetic anomaly sensing system as in claim 17 wherein said axis passes through a center of said square.

19. A magnetic anomaly sensing system as in claim 18 wherein said planar array is positioned between said central one of said three TM sensors and one of said remaining two of said three TM sensors, said system further comprising a second planar array defined by at least four of said plurality of TM sensors with said second planar array being perpendicular to said axis and positioned between said central one of said three TM sensors and the other of said remaining two of said three TM sensors.

20. A magnetic anomaly sensing system as in claim 19 wherein said planar array and said second planar array are mirror images of one another relative to said central one of said three TM sensors.

21. A magnetic anomaly sensing system as in claim 14 wherein said planar array forms a polygon having one of said plurality of said TM sensors at each vertex thereof, said polygon having opposing sides that are of equal length and parallel to one another.

22. A magnetic anomaly sensing system as in claim 21 wherein said central one of said three TM sensors lies at a geometric center of said polygon.

* * * * *